(12) United States Patent
Zhong et al.

(10) Patent No.: US 10,305,331 B2
(45) Date of Patent: May 28, 2019

(54) TRANSMITTER-SIDE CONTROL OF WIRELESS POWER TRANSFER SYSTEMS WITHOUT USING MUTUAL COUPLING INFORMATION OR WIRELESS FEEDBACK

(71) Applicant: The University of Hong Kong, Hong Kong (CN)

(72) Inventors: Wenxing Zhong, Hong Kong (CN); Shu Yuen Hui, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 15/570,676

(22) PCT Filed: Apr. 30, 2015

(86) PCT No.: PCT/CN2015/077954
§ 371 (c)(1),
(2) Date: Oct. 30, 2017

(87) PCT Pub. No.: WO2016/172916
PCT Pub. Date: Nov. 3, 2016

(65) Prior Publication Data
US 2018/0294672 A1 Oct. 11, 2018

(51) Int. Cl.
*H02J 50/12* (2016.01)
*H02J 7/02* (2016.01)
(Continued)

(52) U.S. Cl.
CPC .............. *H02J 50/12* (2016.02); *H01F 38/14* (2013.01); *H02J 7/025* (2013.01); *H02J 7/0029* (2013.01);
(Continued)

(58) Field of Classification Search
CPC .......... H02J 50/12; H02J 7/025; H02J 7/0029; H02J 7/0068; H02J 7/345; H02J 2007/0039; H01F 38/14; H02M 7/5387
See application file for complete search history.

(56) References Cited

U.S. PATENT DOCUMENTS

| 7,279,850 B2 | 10/2007 | Boys et al. |
| 2015/0084428 A1 | 3/2015 | Moon et al. |
| 2016/0181824 A1 | 6/2016 | Hui et al. |

FOREIGN PATENT DOCUMENTS

| CN | 102751793 A | 10/2012 |
| CN | 104584446 A | 4/2015 |
| WO | WO-2014/171255 A1 | 10/2014 |

OTHER PUBLICATIONS

Si, P. et al., "Wireless Power Supply for Implantable Biomedical Device Based on Primary Input Voltage Regulation", *Second IEEE Conference on Industrial Electronics and Applications*, 2007, pp. 235-239, IEEE.

(Continued)

*Primary Examiner* — Robert L Deberadinis
(74) *Attorney, Agent, or Firm* — Saliwanchik, Lloyd & Eisenschenk

(57) ABSTRACT

Wireless power transfer systems and methods are provided. No wireless communication system is necessary feedback output information from the receiver side to the transmitter side. Nor is any knowledge of the mutual coupling or mutual inductance between the transmitter side and the receiver side required. A system can include an intermediate capacitor in the receiver circuit as a power flow indicator and hysteresis on-off switching actions of a decoupling power switch in the receiver circuit to regulate the DC voltage of the intermediate capacitor (for voltage-control) and the load current (for current-control) at a rated value within a narrow tolerance band. The turn-on and turn-off times of the decoupling switch in the receiver circuit can be detected in the transmitter circuit from, for example, the primary winding current or voltage. This can be used to meet the power demand in the receiver circuit dynamically.

41 Claims, 12 Drawing Sheets

(51) Int. Cl.
*H01F 38/14* (2006.01)
*H02J 7/00* (2006.01)
*H02J 7/34* (2006.01)
*H02M 7/5387* (2007.01)

(52) U.S. Cl.
CPC .............. *H02J 7/0068* (2013.01); *H02J 7/345* (2013.01); *H02J 2007/0039* (2013.01); *H02M 7/5387* (2013.01)

(56) References Cited

OTHER PUBLICATIONS

Si, P. et al., "A Frequency Control Method for Regulating Wireless Power to Implantable Devices", *IEEE Transactions on Biomedical Circuits and Systems*, Mar. 2008, 2(1):22-29, IEEE.

Li, H.L. et al., "A Power Flow Control Method on Primary Side for a CPT system", *The 2010 International Power Electronics Conference*, 2010, pp. 1050-1055, IEEE.

Kim, N.Y. et al., "Adaptive frequency with power-level tracking system for efficient magnetic resonance wireless power transfer", *Electronic Letters*, Apr. 12, 2012, 48(8):1-2, The Institute of Engineering and Technology.

Miller, J.M. et al., "Primary-Side Power Flow Control of Wireless Power Transfer for Electric Vehicle Charging", *IEEE Journal of Emerging and Selected Topics in Power Electronics*, Mar. 2015, 3(1):147-162, IEEE.

Thrimawithana, D.J. et al., "A Primary Side Controller for Inductive Power Transfer Systems", *2010 IEEE International Conference on Industrial Technology*, 2010, pp. 661-666, IEEE.

Zaheer, M. et al., "Primary Side Control Based Inductively Coupled Powering Scheme for Biomedical Implants", *Proceedings of the IEEE-EMBS International Conference on Biomedical and Health Informatics (BHI 2012)*, Jan. 2-7, 2012, pp. 174-179, IEEE, Hong Kong and Shenzhen, China.

Triviño-Cabrera, A. et al., "Independent Primary-Side Controller applied to Wireless Chargers for Electric Vehicles", *2014 IEEE International Electric Vehicle Conference (IEVC)*, 2014, pp. 1-5, IEEE.

Yin, J. et al., "A Systematic Approach for Load Monitoring and Power Control in Wireless Power Transfer Systems Without Any Direct Output Measurement", *IEEE Transactions on Power Electronics*, Mar. 2015, 30(3):1657-1667, 2014 IEEE.

Chan, T.-S. et al., "A Primary Side Control Method for Wireless Energy Transmission System", *IEEE Transactions on Circuits and Systems—I: Regular Papers*, Aug. 2012, 59(8):1805-1814, IEEE.

Boys, J.T. et al., "The Inductive Power Transfer Story at the University of Auckland", *IEEE Circuits and Systems Magazine*, May 21, 2015, pp. 6-27, IEEE.

Wu, K. et al., "Wireless Power Transmission, Technology, and Applications", *Proceedings of the IEEE*, Jun. 2013, 101(6)1 271-1275, IEEE.

International Search Report in International Application No. PCT/CN2015/077954, filed Apr. 30, 2015.

TRANSMITTER-SIDE CONTROL OF WIRELESS POWER TRANSFER SYSTEMS WITHOUT USING MUTUAL COUPLING INFORMATION OR WIRELESS FEEDBACK

CROSS-REFERENCE TO RELATED APPLICATION

This application is the U.S. national stage application of International Patent Application No. PCT/CN2015/077954, filed Apr. 30, 2015, the disclosure of which is incorporated herein by reference in its entirety.

BACKGROUND OF THE INVENTION

Inductive power transfer (IPT) or wireless power transfer (WPT) systems have received much attention recently from both the research community and the industrial community. Recent research efforts have focused on several major applications, including wireless charging of consumer electronics, electric vehicles, mobile robots, and medical implants. WPT systems are discussed in, for example, Special Issue: Wireless Power Transmission, Technology & Applications, Proceedings of the IEEE, June 2013, Vol. 101, No. 6.

Existing WPT applications require knowledge of the mutual coupling (k) or mutual inductance (M) between the transmitter (Tx) coil and the receiver (Rx) coil in order to control the power flow from the Tx side to the Rx side. For example, for wireless charging of electric vehicles and portable consumer electronics, the relative positions of the Tx coil and the Rx coil typically cannot be precisely fixed. The nature of a WPT system requires the receiver circuit to be physically separated from the transmitter circuit. In order to have good power control in the receiver circuit, some form of feedback control is required. As is typically used in the art, primary control refers to the use of the transmitter circuit to control the power flow in the receiver circuit. Because the Tx and Rx circuits are physically separated from each other, primary control requires a channel to obtain information on the receiver side for feedback control.

In related art devices, primary-control methods for WPT systems can be classified into the following groups: (i) use of primary side control that requires wireless communication systems to feed information obtained from the receiver circuit back to the transmitter circuit for closed-loop control; or (ii) use of primary (transmitter) control that requires information of the mutual coupling (k) or mutual inductance (M) between the Tx and Rx coils.

Examples of the first type of primary-control method include those of Si et al. (Proc. 2nd IEEE Conf. Ind. Electron. Appl., 2007, pp: 235-239), Malpas et al. (IEEE Trans. Biomed. Circuits Syst., vol. 2, no. 1, pp. 22-29, March 2008), Li et al. (International Power Electronics Conference, 2010, pp: 1050-1055), Kim et al. (*Electron. Lett.*, Vol. 48, No. 8, pp. 452-454, 12 Apr. 2012), and Miller et al. (IEEE Journal of Emerging and Selected Topics in Power Electronics, Vol. 3, No. 1, March 2015, pp: 147-162). FIG. 1 shows a circuit schematic of primary control of a wireless power transfer system using a wireless communication system for feedback purposes (Miller et al., supra.).

Examples of the second type of primary-control method include those of Thrimawithana et al. (IEEE International Conference on Industrial Technology (ICIT), 2010, 14-17 Mar. 2010, pp: 661-666), Zaheer et al. (IEEE-EMBS International Conference on Biomedical and Health Infomatics (BHI 2012), Hong King and Shenzhen, China, 2-7 Jan. 2012, pp: 174-179), Hui et al. U.S. Patent Application Ser. No. 61/862,627, Aug. 6, 2013), Trivino-Cabrera et al. (IEEE International Electric Vehicle Conference (IEVC) 2014, Florence, Italy, 17-19 Dec. 2014, pp: 1-5), and Yin et al. (IEEE Transactions on Power Electronics, Vol. 30, Issue 3, 2015, pp: 1657-1667). In general, such systems either use a pre-determined value of M or estimate the value of M so that the output voltage can be calculated from information available on the transmitter (primary) side.

WPT systems can use a decoupling switch in the receiver circuit. Such decoupling switches have typically been used to decouple a specific load from the transmitter system.

FIG. 2A shows a circuit schematic of a typical circuit that includes a shunt decoupling switch S. It includes a transmitter circuit driving a transmitter (primary) winding with self-inductance $L_1$, which is magnetically coupled to the receiver (secondary) winding $L_2$. The secondary circuit includes a parallel LC resonant tank including $L_2$ and $C_2$. The shunt decoupling switch can also be applied to a secondary circuit with a series resonant LC circuit formed by the series-connected $L_2$ and $C_2$ shown in FIG. 2B. Such a series resonant compensated circuit with a shunt decoupling switch has been reported by Boys et al. (U.S. Pat. No. 7,279,850). Based on circuit theory, the equivalent impedance of the load in the receiver (secondary) circuit can be reflected on the primary side. For the example shown in FIG. 2B, the decoupling switch is a "shunt" switch because it can cause a "short-circuit" to the output of the diode rectifier in the receiver (secondary) circuit. When this shunt switch is closed, the secondary current is shorted to the ground of the secondary circuit and the load is decoupled (i.e., isolated) from the power flow from the primary circuit by the diode D, which is in a blocking state. Thus, the reflected impedance of the load $R_L$ to the primary side is very large when the shunt decoupling switch is closed.

Chan et al. (IEEE Transactions on Circuits and Systems—I, Vol. 59, No. 8, August, 2012, pp: 1805-1814) described another type of decoupling switch. The switch is of a "series" type incorporated in the charging protection circuit (FIG. 3A). This "series" switch Ms is used to protect the battery from over-voltage and over-current conditions (FIG. 3B). Under normal conditions, this series switch Ms is turned on, linking the battery load to the rectified direct current (DC) voltage Vs in the secondary circuit. When the battery voltage Vb exceeds a certain upper threshold voltage, Ms will be turned off through the control of the "voltage protection circuit" in order to avoid an over-voltage condition. Ms will be turned on when Vb falls to a lower threshold voltage level. Ms will also be turned off when the charging current exceeds a certain maximum level through the control of the "current protection circuit" (FIG. 3B).

In both of the "shunt" switch and "series" switch cases, the switching actions (i.e., On and Off states of the decoupling switch) will affect the reflected impedance on the primary side. For example, when the shunt decoupling switch S (see, e.g., FIGS. 2A and 2B) is closed, the output of the rectifier in the secondary circuit is "short-circuited", and the load is isolated from the secondary circuit. Consequently, the reflected impedance of the load to the primary side will change, resulting in a corresponding change in the current and/or voltage of the primary winding. On the contrary, when the series decoupling switch (see, e.g., FIG. 3B) is opened, the load is isolated from the secondary circuit electrically. The reflected load impedance to the primary side will change, causing a corresponding change in the primary winding current and/or voltage.

BRIEF SUMMARY

The subject invention provides wireless power transfer (WPT) systems and methods of that provide primary (transmitter)-side control that does not need any wireless communication system (e.g., radio frequency (RF) system) between the primary side and the secondary (receiver) side (e.g., for any feedback control). The systems and methods of the subject invention also do not require any knowledge of the mutual inductance or mutual coupling factor between the primary and secondary sides.

In an embodiment, a WPT system can include: a transmitter circuit comprising a transmitter winding; and a receiver circuit comprising a receiver winding, an intermediate capacitor, and a decoupling switch. Energy is transferred wirelessly through magnetic coupling of magnetic flux between the transmitter winding and the receiver winding. The system can implement transmitter-side input power control and receiver-side output power control without using any information about mutual inductance between the transmitter circuit and the receiver circuit and without any wireless communication circuit between the transmitter circuit and the receiver circuit providing feedback control (e.g., one or more feedback control signals). For voltage-control mode, the receiver-side output power control can be implemented using voltage of the intermediate capacitor as an indicator for power flow control. The decoupling switch can be used as a control mechanism to regulate the voltage of the intermediate capacitor at a nominal value within a tolerance. For current-control mode, the decoupling switch can be used as a control mechanism to regulate the output current to the load at a nominal value within a tolerance.

In another embodiment, a WPT control method can control a WPT system comprising: a transmitter circuit comprising a transmitter winding; and a receiver circuit comprising a receiver winding, an intermediate capacitor, and a decoupling switch. The method can include: transferring energy wirelessly through magnetic coupling of magnetic flux between the transmitter winding and the receiver winding; and implementing transmitter-side input power control and receiver-side output power control without using any information about mutual inductance between the transmitter circuit and the receiver circuit and without any wireless communication circuit between the transmitter circuit and the receiver circuit providing feedback control (e.g., one or more feedback control signals). For voltage-control mode, the receiver-side output power control can be implemented using a voltage of the intermediate capacitor as an indicator for power flow control. The decoupling switch can be used as a control mechanism to regulate the voltage of the intermediate capacitor at a nominal value within a tolerance. For current-control mode, the decoupling switch can be used as a control mechanism to regulate the output current to the load at a nominal value within a tolerance.

DETAILED DESCRIPTION

Figure 1:
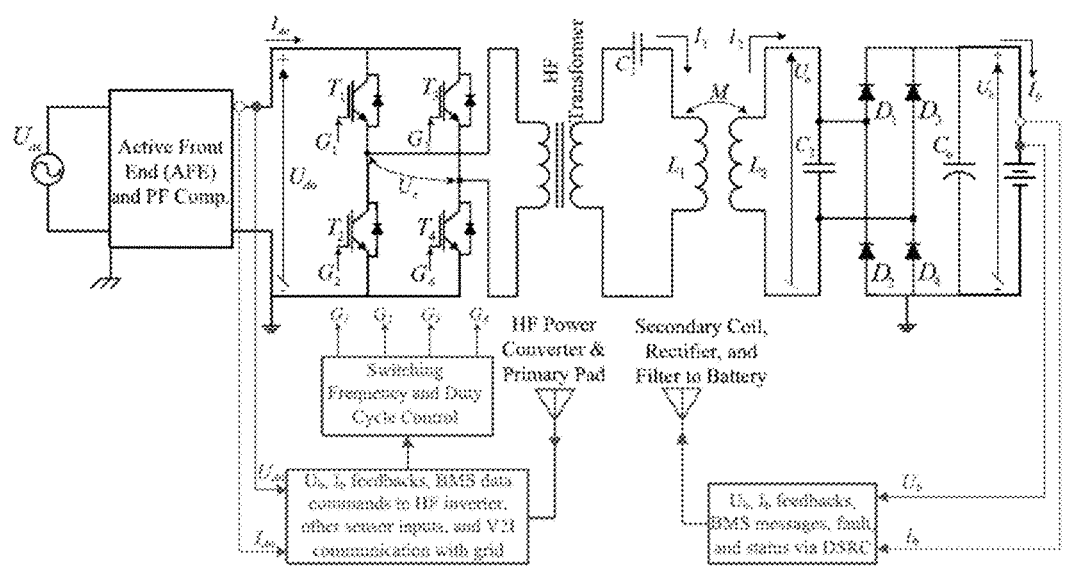
FIG. 1 shows a circuit schematic of primary control of a wireless power transfer system using a wireless communication system for feedback purposes.
Figure 2A:
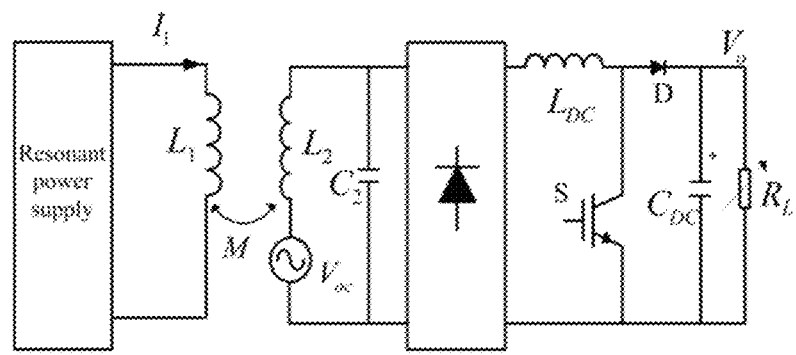
FIG. 2A shows an equivalent circuit for an inductive power transfer system with a decoupling switch S in the secondary circuit including a parallel LC compensating circuit.
Figure 2B:
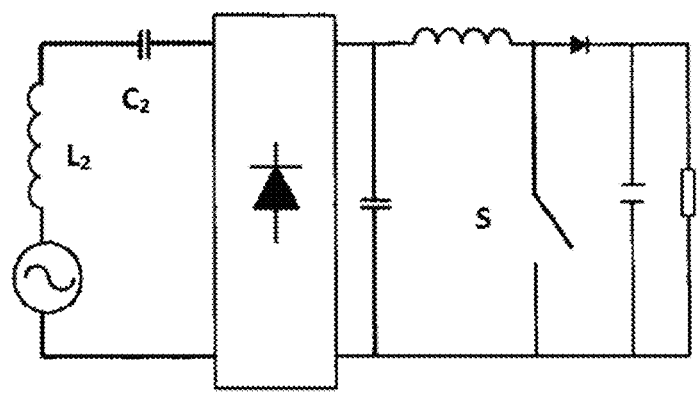
FIG. 2B shows an equivalent circuit of a secondary circuit including a shunt decoupling switch and a series resonant LC compensating circuit.

In many wireless power transfer (WPT) applications, there is a need for a simple primary control method that is independent of the precise knowledge of the mutual inductance between the transmitter (Tx; primary) and receiver (Rx; secondary) coils and that does not require any wireless or radio-frequency (RF) communication systems between the Tx and Rx circuits. For example, when an electric vehicle is parked over a wireless charging system on the floor, the mutual inductance between the Tx coil (fixed on the floor) and the Rx coil (moved with the vehicle) varies from one parking position to another. Another example is the charging of a mobile phone on a wireless charging pad. When a mobile phone is placed on a charging surface, the mutual inductance between the Tx and Rx coils may not be the same each time.

The switching actions of a decoupling switch in the secondary side of a WPT system can affect the reflected impedance to the primary side, and such switching actions can cause sudden changes in the magnitudes of the current and voltage in the primary winding. However, there is no existing systematic theory and method on how to utilize these two pieces of information for closed loop control on the primary side without requiring mutual inductance information and an RF communication system to feed back the load information. Embodiments of the subject invention can be realized in terms of, for example, a voltage-control mode and a current-control mode. These control modes can be used either individually or together, depending on the application. Both the voltage-control mode and the current-control mode are described herein.

Embodiments of the subject invention include WPT systems and methods that utilize primary-side input power control and/or secondary-side hysteresis output power control. No knowledge of mutual inductance is required, nor is any RF communication system for feeding back the load conditions to the primary side. Systems and methods of the subject invention can include the use of one or more of the following elements: (i) the voltage of an intermediate capacitor in the secondary circuit as an indicator of power/energy transfer; (ii) a hysteresis control of a decoupling switch to "charge" and "discharge" the intermediate capacitor so as to regulate the capacitor voltage within the upper and lower tolerance band of a nominal voltage level; and (iii) the charging time and discharging time detected in the primary circuit as the feedback variables for controlling the input power of the primary circuit for closed-loop control of the WPT system. For example, all three of the elements can be combined and used together.

The intermediate capacitor can be a capacitor that provides an energy buffer between the energy received by the secondary winding to the load. Embodiments of the subject invention do not need precise information about the mutual inductance between the Tx and Rx coils and does not need any RF communication system between the Tx and Rx circuits.

Systems and methods of the subject invention can be applied to a range of power converters commonly used in a transmitter circuit of a WPT system. Examples of such converters include: a DC-AC (direct current-alternating current) power converter (also referred to as a power inverter) using phase-shift control (in which the control variable for input power control is the phase shift of the power inverter); a DC-AC power converter using frequency control (in which the control variable for input power control is the frequency of the AC output voltage of the power inverter); and a 2-stage power converter, such as an AC-DC-AC power converter or a DC-DC-AC power converter, with variable voltage control on the intermediate DC voltage link (in which the input power control is carried out by controlling the output dc voltage of the first power stage).

Figure 4:
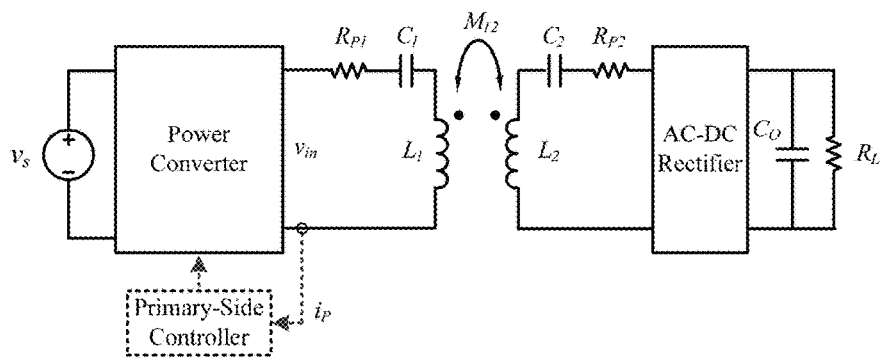
FIG. 4 shows a circuit schematic of the structure of a two-coil wireless power transfer (WPT) system applying constant current control.

FIG. 4 shows a circuit schematic of the structure of a two-coil WPT system applying constant current control. The secondary circuit of this WPT system includes a series-resonant compensation circuit including $L_2$ and $C_2$ Referring to FIG. 4, if the load $R_L$ on the secondary side is reflected to the primary side, the reflected load resistance $R_{reflected}$ becomes:

$$R_{reflected} = \frac{\omega^2 M^2}{R_{P2} + R'_L} \quad (1)$$

where $$R'_L = \frac{8}{\pi^2} R_L$$

is the equivalent impedance seen into the rectifier, $R_{p2}$ is the resistance of the secondary winding, $\omega$ is the angular frequency and M is the mutual inductance between the primary (Tx) and secondary (Rx) windings.

Figure 5:
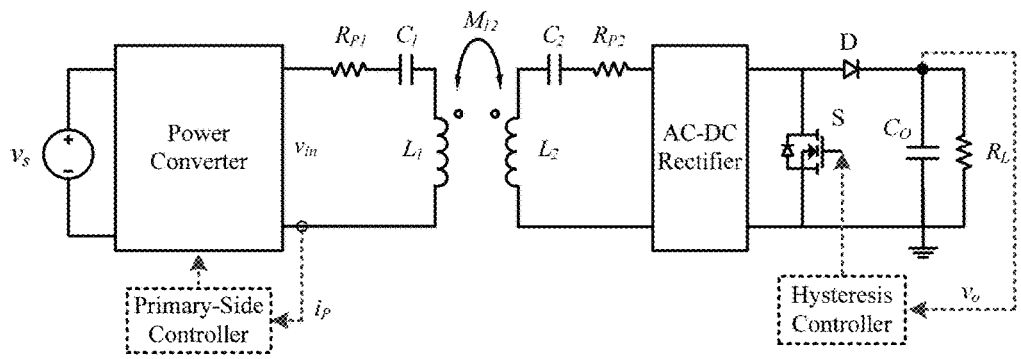
FIG. 5 shows a circuit schematic of a WPT system using a directional switch according to an embodiment of the subject invention.

Equation (1) provides important insights into the differences of the use of a shunt decoupling switch and a series decoupling switch. If a "shunt" decoupling switch is adopted for the secondary circuit with a series-resonant $L_2C_2$ compensation circuit (as shown in FIG. 5), when the shunt switch is closed to isolate the load electrically, the reflected impedance of the secondary circuit to the primary side becomes large. This can cause a decrease in the current of the primary winding, which is an advantageous feature (in terms of high energy efficiency and low current stress), not only for low-power applications but also for medium- and high-power applications. If a "series" decoupling switch is adopted for the secondary circuit with a series-resonant $L_2C_2$ compensation circuit, when the series switch is opened to isolate the load electrically, the reflected impedance to the primary side becomes small. This can cause an increase in the current in the primary winding, which can be relatively disadvantageous. Therefore, in a preferred embodiment of the subject invention, a shunt decoupling switch is used. Also, it can be easier to design a gate drive circuit for a shunt switch because such a gate drive circuit can share the same ground with the shunt switch in the secondary circuit.

The output power delivered to the secondary side ($P_{out}$) is:

$$P_{out} = i_P^2 \frac{\omega^2 M^2}{R_{P2} + R'_L} \quad (2)$$

where $i_P$ is the current in the primary (Tx) winding.

If the power losses of the converters and $R_{P2}$ are negligible compared to the output power, the output power can be expressed as:

$$P_{out} = i_P^2 \frac{\omega^2 M^2}{R'_L} = \pi^2 i_P^2 \frac{\omega^2 M^2}{8 R_L} \quad (3)$$

On the other hand, the output power can also be expressed as $$P_{out} = \frac{V_{out}^2}{R_L} \quad (4)$$

where $V_{out}$ is the output dc voltage of the secondary circuit.

By combining Equations (3) and (4), $$V_{out}^2 = \frac{\pi^2}{8}\omega^2 M^2 i_P^2 \tag{5}$$

Taking square root on both sides of Equation (5), $$V_{out} = \frac{\omega \pi M}{2\sqrt{2}} i_P \tag{6}$$

Equation (5) indicates that, for a given angular frequency ω and mutual inductance M, the output voltage $V_{out}$ of the secondary circuit is proportional to the primary current $i_p$.

Equation (6) can be rewritten as follows:

$$V_{out} = \omega \lambda i_P \tag{7}$$

where $$\lambda = \frac{\pi M}{2\sqrt{2}}.$$

For "stationary" wireless charging (i.e., no dynamic movement between the Tx and Rx coils during the charging period), the mutual inductance M can be considered as a constant. In this case, the coefficient λ in Equation (7) is a constant for each set of relative locations of the Tx and Rx coils. Equation (7) provides an understanding that, for a given angular frequency ω, $V_{out}$ is proportional to $i_p$. However, the coefficient λ is also an unknown, although it is a constant. For "dynamic" wireless charging where the receiver coil may move with respect to the position of the transmitter coil during the charging period, the coefficient λ is time varying. However, if the electrical time constant of the control loop is much smaller than the mechanical time constant of the movement of the receiver coil, the coefficient λ does not change significantly during the control action within each operating period of the control loop. Systems and methods of the subject invention can advantageously provide control that does not need to calculate λ. Such control systems and methods can then be independent of λ and M.

Figure 6:
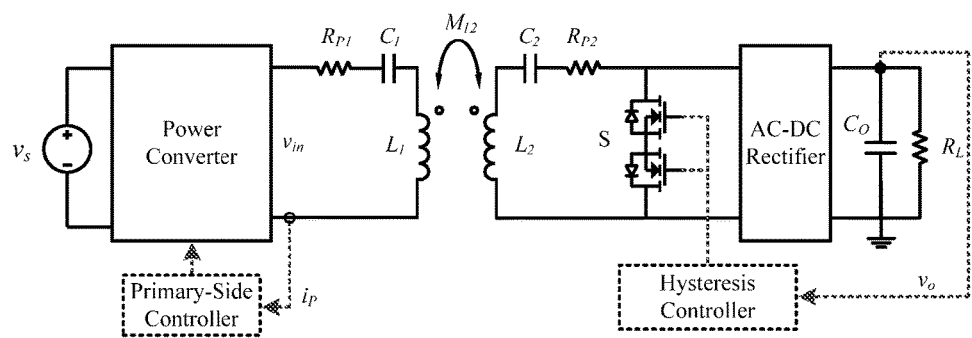
FIG. 6 shows a circuit schematic of a WPT system using a bidirectional switch according to an embodiment of the subject invention.
Figure 7:
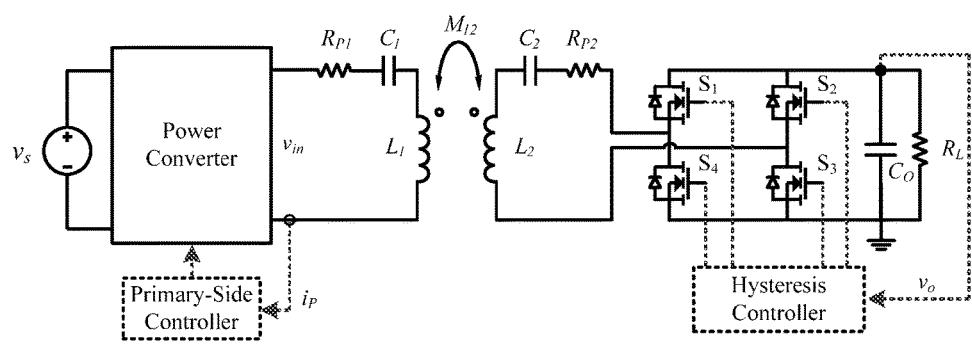
FIG. 7 shows a circuit schematic of a WPT system using a full-bridge synchronous rectifier according to an embodiment of the subject invention.

In certain embodiments, systems and methods of the subject invention can be applied to a WPT system with a decoupling switch and a capacitor in the secondary circuit. FIG. 5 shows a circuit schematic of a WPT system using a directional switch according to an embodiment of the subject invention; FIG. 6 shows a circuit schematic of a WPT system using a bidirectional switch according to an embodiment of the subject invention; and FIG. 7 shows a circuit schematic of a WPT system using a full-bridge synchronous rectifier according to an embodiment of the subject invention. The load in FIGS. 5-7 is represented as a resistive load $R_L$ to simplify the explanation. In practice, the load is not restricted to a resistive load; the load can be any suitable load known in the art, including but not limited to a DC-DC power converter charging a battery under the control of a battery charging controller. The intermediate capacitor $C_o$ does not need to be connected directly to a pure resistive load. The resistive load in FIGS. 5-7 therefore can represent a sub-circuit feeding the actual physical electric load.

Figure 3A:
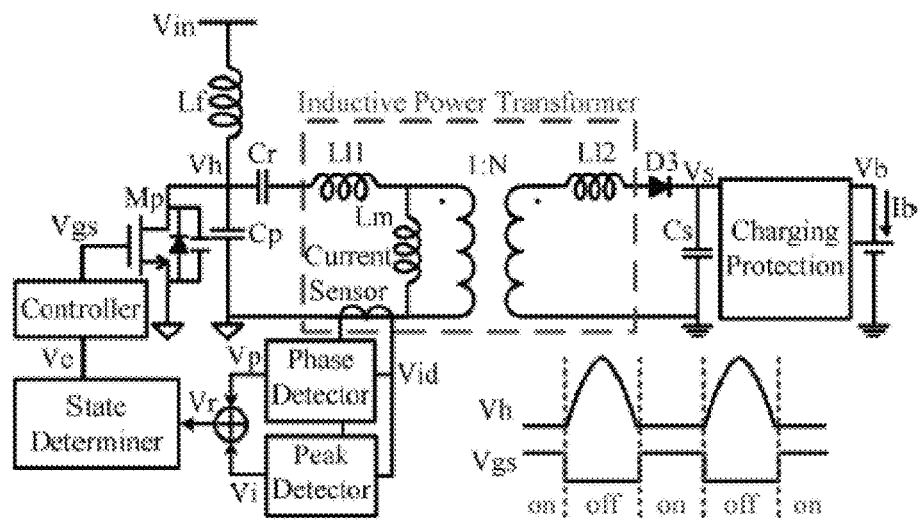
FIG. 3A shows a circuit schematic of a wireless power transfer system with a charging protection circuit.
Figure 3B:
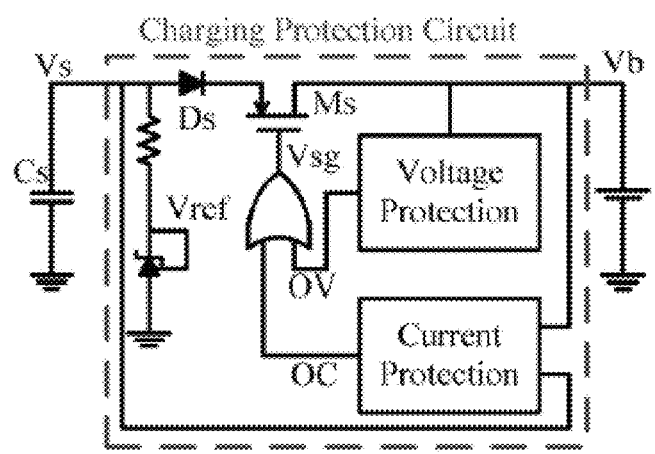
FIG. 3B shows a circuit schematic illustrating the use of a series switch Ms in a charging protection circuit to decouple the battery in cases of over-voltage and over-current conditions.

In many embodiments, a decoupling switch can be included. The decoupling switch is preferably a "shunt" decoupling switch, though a "series" decoupling switch can be used instead. For a typical load, the equivalent load resistance reflected to the primary side can generally be represented as a value within a range from a minimum value of $R_{L(min)}$ to a very large value. When the shunt decoupling switch is closed (e.g., FIG. 5), the equivalent secondary load becomes zero. In this case, the reflected impedances of the equivalent secondary load (see Equation (1)) with and without the shunt decoupling switch being turned on or off can be easily detected from the electric variable in the primary circuit, such as the magnitude of the primary winding current or voltage. For example, the large reflected impedance of the secondary circuit when the shunt switch is turned on to decouple the load can cause a significant reduction in the primary current. It can therefore be easy to differentiate the on/off state of the shunt decoupling switch from the primary side. On the contrary, a "series" decoupling switch, such as that in FIG. 3B, would cause an increase in the primary winding current when the series switch is activated to decouple the load, and consequently would reduce the system energy efficiency. In order to improve the energy efficiency if a series decoupling switch is needed, a parallel LC compensation circuit can be used before the rectifier in the secondary circuit. The secondary circuit in FIG. 3A, which does not have a resonant capacitor connected in parallel with the secondary winding (including the leakage inductance Li2 in FIG. 3A), does not offer high energy efficiency. FIGS. 5-7 each use a shunt decoupling switch.

Referring to FIG. 5, in an embodiment, a WPT system can include a shunt decoupling switch together with a hysteresis controller for regulating the voltage across the intermediate capacitor $C_o$. Because the switch S is placed on the DC side of the rectifier, a directional switch can be used. On the transmitter side, a primary-side controller can be used to control the input power. The system can include a primary-side controller for controlling the input power and a hysteresis controller for controlling the decoupling switch. The hysteresis controller can regulate the voltage across the intermediate capacitor in the secondary circuit.

Referring to FIG. 6, in an embodiment, a bidirectional shunt decoupling switch can be used and can be placed on the AC side of a rectifier. Such a bidirectional decoupling switch can be used in association with a hysteresis controller for regulating the capacitor. The system can therefore include a primary-side controller for input power control and a secondary-side hysteresis controller for controlling the decoupling switch to regulate the capacitor voltage.

Referring to FIG. 7, in an embodiment, a synchronous rectifier can be used to replace the diode rectifier in order to reduce the conduction loss of the diode rectifier. Under normal synchronous rectifier operation, the diagonal switch pair (i.e., the pair of S1 and S3 and the other pair of S2 and S4) can be controlled together at the same switching state. The switching states of the two switch pairs can be controlled in a complimentary manner (i.e., when S1 and S3 are turned on, S2 and S4 are turned off, and vice versa). When the load has to be decoupled or isolated from the secondary winding, the decoupling switch function can be performed by closing either the switch pair of S1 and S2 together or the switch pair of S3 and S4 together. By closing either switch pair under this decoupling switch operation, the output of the AC circuit is shorted, therefore isolating or decoupling the load from the secondary winding. The decoupling switching actions of the synchronous rectifier can be associated with a hysteresis controller that regulates the voltage of the intermediate capacitor $C_o$.

Figure 8:
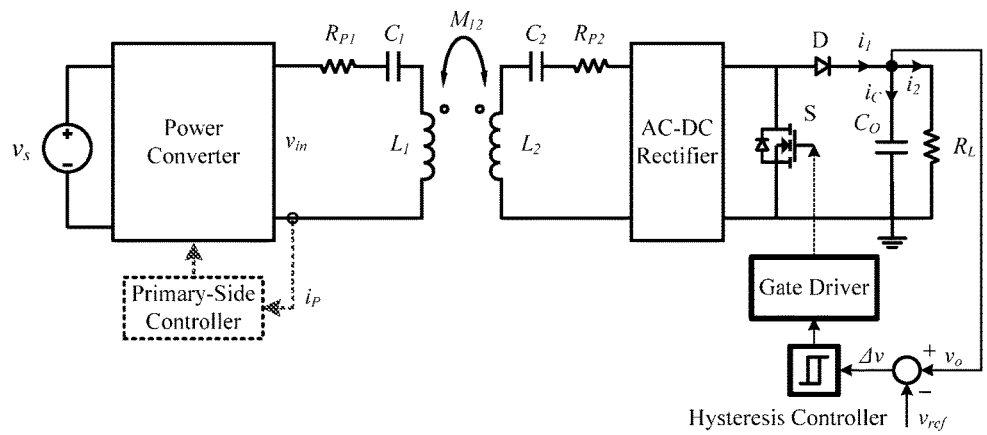
FIG. 8 shows a circuit schematic of hysteresis output power control loop for the secondary side of the WPT system of FIG. 5.

In many embodiments, the primary-side control and the secondary-side hysteresis control can work together. Referring again to FIG. 5, the hysteresis controller can regulate the voltage across the capacitor $C_o$. The voltage of a capacitor can be used as a power transfer indicator. FIG. 8 shows a circuit schematic of hysteresis output power control loop for the secondary side of the WPT system of FIG. 5. Using the secondary circuit of FIG. 5 for illustration in FIG. 8, the dynamic equations of the intermediate capacitor are:

$$i_C = i_1 - i_2 \tag{8}$$

$$i_C = C_o \frac{dV_o}{dt} \tag{9}$$

Equations (8) and (9) show that the intermediate capacitor current can be used as an indicator for power transfer. For the capacitor voltage regulated to a nominal (reference) value Vo* within a tight tolerance by the hysteresis control, if the current supplied to the capacitor ($i_1$) meets the load current ($i_2$), the capacitor current ($i_c$) becomes zero according to Equation (8). If there is any imbalance between $i_1$ and $i_2$, it will be reflected in the capacitor voltage (Vo) according to Equation (9). Therefore, by using a secondary-side hysteresis control to ensure that the Vo within a narrow tolerance band of Vo*, the load demand can be automatically met by power supply.

Figure 9:
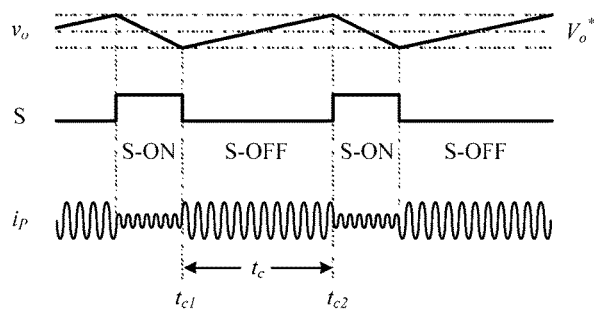
FIG. 9 shows waveforms of the capacitor voltage, the gate signal for the decoupling switch, and the primary current in the time domain.

When the shunt decoupling switch S of FIG. 8 is turned on, $i_1=0$ and $i_c=-i_2$ according to Equation (8). Thus, $i_c$ is negative because $i_2$ is positive. A negative $i_c$ means that the capacitor $C_o$ is being discharged when the shunt decoupling switch S is turned on. FIG. 9 shows waveforms of the capacitor voltage, the gate signal for the decoupling switch, and the primary current in the time domain. Based on Equation (9), the dVo/dt is negative, meaning that the capacitor voltage (Vo) is ramping down as shown in the timing diagram in FIG. 9.

When the shunt decoupling switch S of FIG. 8 is turned off, $i_1>0$ and $i_c=i_1-i_2$. Since the primary-side control is designed to provide sufficient power for the load in the secondary, $i_1>i_2$ under normal operation. When S is turned off, $i_c$ is positive and dVo/dt is positive, meaning that the capacitor voltage (Vo) is ramping up as shown in FIG. 9.

The secondary-side hysteresis control can be understood from the charging and discharging process by the decoupling switch in FIG. 9. When the decoupling switch S is turned on, the load is decoupled electrically from the secondary (Rx) circuit. The reflected impedance of the load on the primary side will appear as a large impedance. Consequently, the current in the primary winding ($i_p$) will suddenly drop as indicated in FIG. 7 when S is turned on. When S is turned on again, the reflected impedance of the load will become relatively small again; therefore the $i_p$ will increase back to the normal magnitude. The magnitude of $i_p$ in the primary circuit provides the information of the switching states of the decoupling switch S in the secondary circuit. Therefore, it forms the link between the operation between the primary-side input power control and the secondary-side hysteresis capacitor voltage control. Although principles of this invention have been explained with reference to the circuit of FIG. 5, the invention is not limited thereto. Systems and methods of the subject invention can be applied to many WPT systems, including but not limited to those shown in FIGS. 6 and 7, that have a decoupling switch function and a capacitor in the secondary circuit.

Because the magnitude of the primary winding current contains the information of the switching state of the decoupling switch S, the primary-side input power control can be coordinated with the secondary-side hysteresis capacitor voltage control by monitoring the magnitude of the primary winding current ($i_p$). This can be done without using any mutual inductance information or any RF communication systems between the Tx and Rx circuits.

The primary-side input power control can be applied to a range of Tx circuits, including but not limited to DC-AC power converters with phase-shift control, DC-AC power converters with frequency control, and AC-DC-AC power converters with control in the intermediate DC link voltage. The primary-side input power control involves the detection of at least one electric variable in the primary circuit, such as the current or the voltage of the primary (Tx) winding. The instant of the turn-off of the shunt decoupling switch (or the instant when magnitude of the primary winding current or voltage suddenly increases) $t_{c1}$ and the instant of the turn-on of the shunt decoupling switch (or the instant when the magnitude of the primary winding current or voltage suddenly decreases) $t_{c2}$ can be estimated from the magnitude of the primary winding current ($i_p$) and/or voltage ($v_P$) (see, e.g., FIGS. 9 and 15). The time difference between $t_{c2}$ and $t_{c1}$ can be calculated to form the charging time ($t_c$) of the intermediate capacitor Co. Such capacitor charging time $t_c$ can then be subtracted from a charging time reference $t_{c\_ref}$ to produce an error signal $\Delta t$, which in turn can be fed to a compensator or controller (such as lead-lag or proportional-integral (PI) controller) to vary the control variable of the transmitter circuit. The time instants of $t_{c1}$ and $t_{c2}$ can be regularly sampled so that the charging time $t_c$ can be updated periodically for the transmitter-side control.

When $\Delta t > 0$, the charging time is shorter than the designated value, and the input power should therefore be decreased in order to prolong the charging time. In the case of a DC-AC power converter with phase-shift control, the phase-shift of the inverter should be increased. In the case of a DC-AC power converter with frequency control, the frequency should be increased further from the resonant frequency, for example in order to reduce the input power. In the case of an AC-DC-AC converter, the duty cycle should be decreased in order to output a lower DC link voltage for the inverter.

When $\Delta t < 0$, the charging time is longer than the designated value, and the input power should therefore be increased in order to shorten the charging time. The control variables of the primary-side power converter should be controlled to increase the input power on the primary side.

Figure 10:
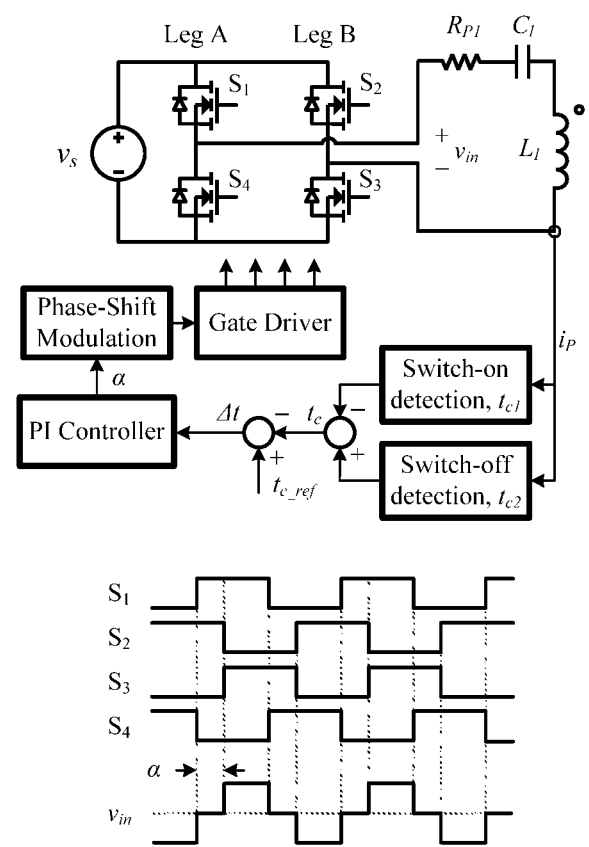
FIG. 10 shows a control block (top) and switching diagram (bottom) for a primary full-bridge inverter applying phase-shift control method according to an embodiment of the subject invention.
Figure 11:
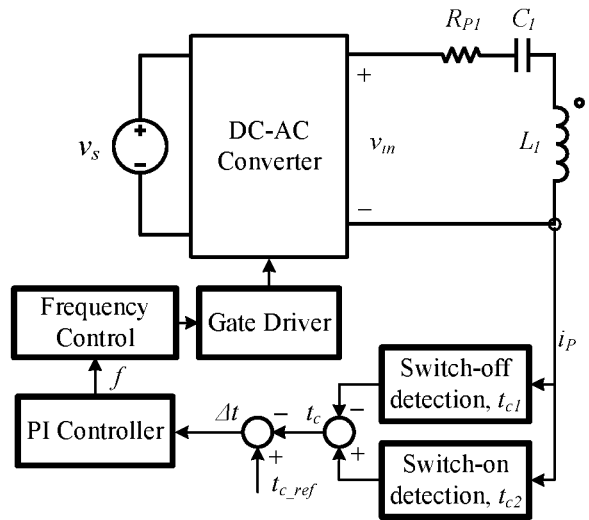
FIG. 11 shows a control loop for the primary DC-AC converter applying frequency control method according to an embodiment of the subject invention.
Figure 12:
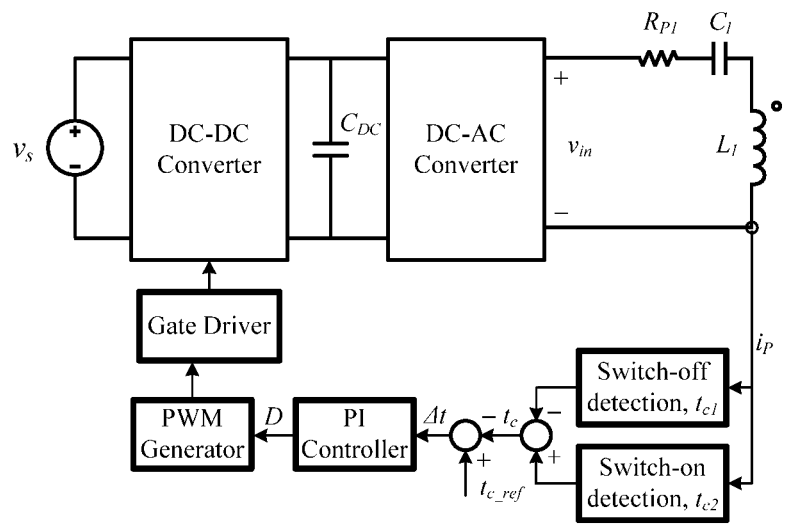
FIG. 12 shows a control loop for a primary DC-DC converter to regulate the input DC voltage of a DC-AC converter; the DC-AC converter can operate with constant frequency.

In the case of the power converter using phase-shift control, the variable is the phase shift angle. The phase shift angle ($\alpha$) refers to the phase angle between the rising edges of the turn-on signals of the diagonal switch pair of S1 and S3, as shown in FIG. 10, which shows a control block (top) and switching diagram (bottom) for a primary full-bridge inverter applying phase-shift control method according to an embodiment of the subject invention. In the case of a power converter with frequency control, the variable is the operating frequency of the DC-AC power converter (FIG. 11). In the case of an AC-DC-AC power converter with an intermediate DC link voltage, the control variable can be the intermediate DC link voltage (FIG. 12).

Embodiments of the subject invention provide control schemes of primary-side input power control and/or secondary-side output power control. Such control schemes can be implemented in digital form (e.g., using a microprocessor, micro-controller, and/or digital signal processor), in analog form (e.g., using analog electronics), or a combination thereof. The control block diagrams of the secondary-side hysteresis control (FIG. 8) and those of the primary-side input power control (FIGS. 10-12) illustrate the basic principles of the invention without using any mutual inductance information and any RF communication between the transmitter and receiver circuits. These are provided for exemplary purposes only, and the systems and methods of the invention can be implemented in many other forms.

In many embodiments, a WPT system can include a transmitter (primary) circuit with a transmitter winding (e.g., a coil) and a receiver (secondary) circuit with a receiver winding (e.g., a coil), in which energy is transferred wirelessly through the magnetic coupling of the AC magnetic flux between the transmitter winding and the receiver winding, and in which primary-side input power control and secondary-side output power control are implemented without using any information of the mutual inductance, without using any radio-frequency communication circuit between the transmitter and receiver circuits for feedback control purposes, or without using either. The secondary-side output power control can utilize the voltage of an intermediate capacitor as an indicator for power flow control and a decoupling switch with a control mechanism to regulate the voltage of the intermediate capacitor, which can be connected directly or indirectly to the load, at a nominal value within a tolerance. The primary-side input power control can detect the charging times and discharging times of the intermediate capacitor of the secondary circuit through the detection of at least one electric variable in the primary circuit and can use these charging and discharging times to derive a control signal for a closed-loop controller on the a primary side to control the input power in order to meet the output power or load demand on the secondary side dynamically. The at least one electric variable can be, for example, the magnitude of the primary winding current, the magnitude of the primary winding voltage, or both, though embodiments are not limited thereto.

In voltage-control mode, as discussed herein, the voltage can be regulated across the intermediate capacitor in the secondary circuit. In many applications, though, such as the charging of a battery, current-control mode can be used, at least initially. The current-control mode can, in some cases, be subsequently followed by voltage-control mode (e.g., to charge a battery). Embodiments that have been described herein in terms of voltage-control mode can easily be extended to current-control mode. In many embodiments, both voltage-control mode and current-control mode can be used together in a WPT system or method.

Figure 19:
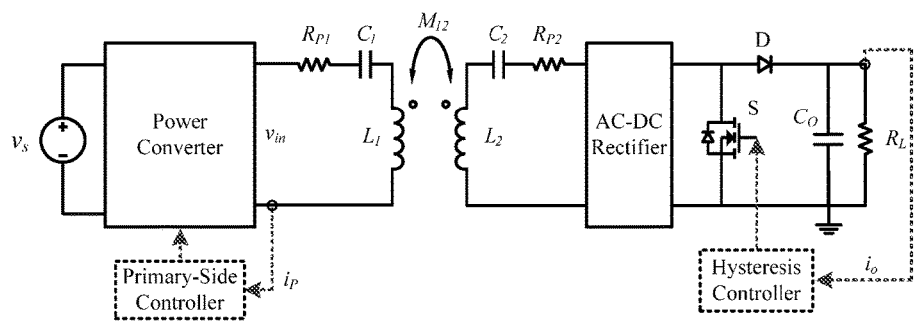
FIG. 19 shows a WPT system using a hysteresis current control in the secondary circuit according to an embodiment of the subject invention.
Figure 20:
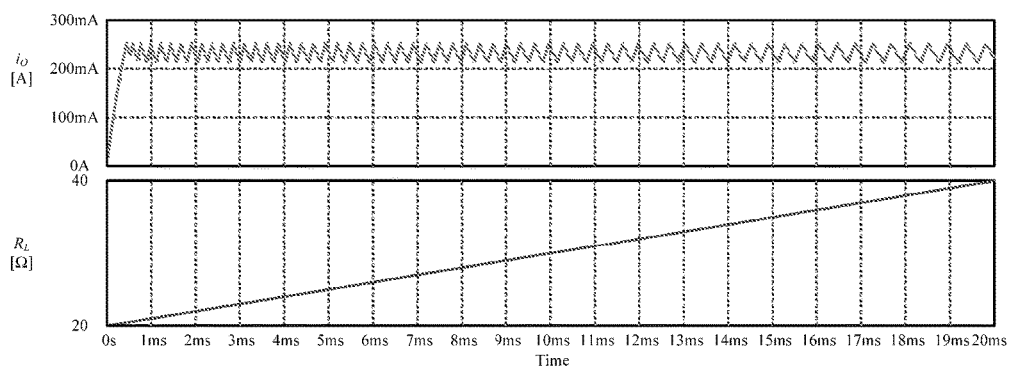
FIG. 20 shows a waveform of the load current under hysteresis current-control mode according to an embodiment of the subject invention.

FIG. 19 shows a WPT system using a hysteresis current control in the secondary circuit, and FIG. 20 shows a waveform of the load current under hysteresis current-control mode. Referring to FIG. 19, current-control mode is illustrated, in which a hysteresis controller can be used to control the S (e.g., shunt decoupling switch) so that the current to the load ($i_o$) is regulated to a nominal value within a tolerance (e.g., a tight tolerance). The capacitor charging time ($t_c$) discussed previously for the voltage-control mode can be replaced by the current-ramp-up tune of the output current, as shown in FIG. 20. The current-control function can advantageously be used for battery charging, which may require the charging current to be limited to a certain maximum value in order to protect the battery FIG. 20 shows typical output load current under this hysteresis current-control mode for a changing load such as a battery. For battery charging, the current-control mode can be switched to the voltage-control mode when the battery voltage has reached a certain level (e.g., a level specified by the battery manufacturer(s)).

The secondary-side output power control can use hysteresis control to regulate the intermediate capacitor voltage for voltage-control mode and the load current for current-control mode to a nominal value within a tolerance (or a hysteresis band). The secondary circuit of can use at least one power switch as a decoupling switch to decouple or isolate the load from receiving power directly from the secondary winding periodically. The load can receive power stored in the intermediate capacitor when the decoupling switch is activated, thereby discharging the capacitor during this period. The decoupling switch can be a shunt decoupling switch or a series decoupling switch, but a shunt decoupling switch is preferred, particularly when it is used with a secondary circuit with a series-resonant compensation circuit (as shown in FIGS. 5-8).

The primary-side input power control is not restricted to one particular type of power-electronics-based power converters, but can be applied to a range of power converter arrangements that can be used as the transmitter (primary) circuit. The primary-side control can use at least one control variable to control the input power in the transmitter circuit. The control variable of the transmitter circuit can be, for example, the phase-shift angle of the output voltage, the frequency of the output voltage, the magnitude of the output voltage, the magnitude of the output current, the DC link voltage, or a combination thereof, though embodiments are not limited thereto.

The primary-side input power control and the secondary-side output power control can be implemented in analog form, digital form, or a combination thereof. In certain embodiments, the voltage tolerance of the hysteresis control can be tight.

Systems and methods of the subject invention can be used for, for example, wireless charging for electric vehicles, medical implants, and portable consumer electronic devices, though embodiments are not limited thereto. Because precise information about mutual inductance between the transmitter coil and the receiver coil is not necessary, the subject invention can be used for stationary charging, where the load remains fixed, as well as for dynamic charging, where the load moves.

The subject invention includes, but is not limited to, the following exemplified embodiments.

Embodiment 1

A WPT system, comprising:
a transmitter circuit comprising a transmitter winding; and
a receiver circuit comprising a receiver winding, an intermediate capacitor, and a decoupling switch,
wherein energy is transferred wirelessly through magnetic coupling of magnetic flux between the transmitter winding and the receiver winding, and
wherein the system implements transmitter-side input power control and receiver-side output power control without using any information about mutual inductance between the transmitter circuit and the receiver circuit and without any wireless communication circuit between the transmitter circuit and the receiver circuit providing feedback control.

Embodiment 2

The WPT system according to embodiment 1, wherein the receiver-side output power control is implemented using a voltage of the intermediate capacitor as an indicator for power flow control, and wherein the decoupling switch is used as a control mechanism to regulate the voltage of the intermediate capacitor at a nominal value within a tolerance.

Embodiment 3

The WPT system according to embodiment 1, wherein the receiver-side output power control is implemented using an output current to a load of the receiver circuit, and
wherein the decoupling switch is used as a control mechanism to regulate the output current to the load of the receiver circuit at a nominal value within a tolerance.

Embodiment 4

The WPT system according to any of embodiments 1-3, wherein the intermediate capacitor is connected directly to a load.

Embodiment 5

The WPT system according to any of embodiment 1-3, wherein the intermediate capacitor is connected indirectly to a load.

Embodiment 6

The WPT system according to any of embodiments 1-5, wherein the transmitter-side input power control detects charging times and discharging times of the intermediate capacitor of the receiver circuit by detecting at least one electric variable in the transmitter circuit.

Embodiment 7

The WPT system according to embodiment 6, wherein the at least one electric variable in the transmitter circuit comprises the magnitude of a current of the transmitter winding, the magnitude of a voltage of the transmitter winding, or both.

Embodiment 8

The WPT system according to any of embodiments 6-7, wherein the detected charging times and discharging times are used to derive a control signal for closed-loop control on the transmitter side to control the input power.

Embodiment 9

The WPT system according to embodiment 8, wherein the input power is controlled to dynamically meet the output power or load demand on the receiver side.

Embodiment 10

The WPT system according to any of embodiment 1-9, wherein the receiver-side output power control uses hysteresis control to regulate the voltage of the intermediate capacitor to a nominal value within a tolerance or a hysteresis band.

Embodiment 11

The WPT system according to embodiment 10, wherein the tolerance of the hysteresis control is tight.

Embodiment 12

The WPT system according to any of embodiments 1-11, wherein the decoupling switch of the receiver circuit is configured to periodically decouple or isolate a load from receiving power directly from the receiver winding.

Embodiment 13

The WPT system according to any of embodiments 1-12, wherein a load connected to the receiver circuit receives power stored in the intermediate capacitor when the decoupling switch of the receiver circuit is activated, thereby discharging the intermediate capacitor when the load receives the power stored in the intermediate capacitor.

Embodiment 14

The WPT system according to any of embodiments 1-13, wherein the decoupling switch of the receiver circuit is a shunt decoupling switch.

Embodiment 15

The WPT system according to any of embodiments 1-13, wherein the decoupling switch of the receiver circuit is a series decoupling switch.

Embodiment 16

The WPT system according to any of embodiments 1-15, wherein the transmitter-side input power control uses a control variable to control the input power to the transmitter circuit.

Embodiment 17

The WPT system according to embodiment 16, wherein the control variable comprises at least one of a phase-shift angle of an output voltage, a frequency of the output voltage, the magnitude of the output voltage, the magnitude of an output current, and a DC link voltage.

Embodiment 18

The WPT system according to any of embodiments 1-17, wherein the transmitter-side input power control and the receiver-side output power control are implemented in analog form, digital form, or a combination thereof.

Embodiment 19

The WPT system according to any of embodiments 1-17, wherein the transmitter-side input power control and the receiver-side output power control are implemented in analog form.

Embodiment 20

The WPT system according to any of embodiments 1-17, wherein the transmitter-side input power control and the receiver-side output power control are implemented in digital form.

Embodiment 21

The WPT system according to any of embodiments 1-17, wherein the transmitter-side input power control and the receiver-side output power control are implemented in a combination of analog form and digital form.

Embodiment 22

The WPT system according to any of embodiments 1-21, wherein the transmitter winding is a transmitter coil.

Embodiment 23

The WPT system according to any of embodiments 1-22, wherein the receiver winding is a receiver coil.

Embodiment 24

A WPT control method for a WPT system comprising: a transmitter circuit comprising a transmitter winding; and a receiver circuit comprising a receiver winding, an intermediate capacitor, and a decoupling switch, wherein the method comprises:
transferring energy wirelessly through magnetic coupling of magnetic flux between the transmitter winding and the receiver winding; and
implementing transmitter-side input power control and receiver-side output power control without using any information about mutual inductance between the transmitter circuit and the receiver circuit and without any wireless communication circuit between the transmitter circuit and the receiver circuit providing feedback control.

Embodiment 25

The WPT method according to embodiment 24, wherein the receiver-side output power control is implemented using a voltage of the intermediate capacitor as an indicator for power flow control, and
wherein the decoupling switch is used as a control mechanism to regulate the voltage of the intermediate capacitor at a nominal value within a tolerance.

Embodiment 26

The WPT method according to embodiment 24, wherein the receiver-side output power control is implemented using an output current to a load of the receiver circuit, and
wherein the decoupling switch is used as a control mechanism to regulate the output current to the load of the receiver circuit at a nominal value within a tolerance.

Embodiment 27

The WPT method according to any of embodiments 24-26, wherein the intermediate capacitor is connected directly to a load.

Embodiment 28

The WPT method according to any of embodiment 24-26, wherein the intermediate capacitor is connected indirectly to a load.

Embodiment 29

The WPT method according to any of embodiments 24-28, wherein implementing transmitter-side input power control comprises detecting charging times and discharging times of the intermediate capacitor of the receiver circuit by detecting at least one electric variable in the transmitter circuit.

Embodiment 30

The WPT method according to embodiment 29, wherein the at least one electric variable in the transmitter circuit comprises the magnitude of a current of the transmitter winding, the magnitude of a voltage of the transmitter winding, or both.

Embodiment 31

The WPT method according to any of embodiments 29-30, wherein the detected charging times and discharging times are used to derive a control signal for closed-loop control on the transmitter side to control the input power.

Embodiment 32

The WPT method according to embodiment 31, wherein the input power is controlled to dynamically meet the output power or load demand on the receiver side.

Embodiment 33

The WPT method according to any of embodiment 24-32, wherein implementing receiver-side output power control comprises using hysteresis control to regulate the voltage of the intermediate capacitor to a nominal value within a tolerance or a hysteresis band.

Embodiment 34

The WPT method according to embodiment 33, wherein the tolerance of the hysteresis control is tight.

Embodiment 35

The WPT method according to any of embodiments 24-34, wherein the decoupling switch of the receiver circuit periodically decouples or isolates a load from receiving power directly from the receiver winding.

Embodiment 36

The WPT method according to any of embodiments 24-35, wherein a load connected to the receiver circuit receives power stored in the intermediate capacitor when the decoupling switch of the receiver circuit is activated, thereby discharging the intermediate capacitor when the load receives the power stored in the intermediate capacitor.

Embodiment 37

The WPT method according to any of embodiments 24-36, wherein the decoupling switch of the receiver circuit is a shunt decoupling switch.

Embodiment 38

The WPT method according to any of embodiments 24-36, wherein the decoupling switch of the receiver circuit is a series decoupling switch.

Embodiment 39

The WPT method according to any of embodiments 24-38, wherein implementing transmitter-side input power control comprises using a control variable to control the input power to the transmitter circuit.

Embodiment 40

The WPT method according to embodiment 39, wherein the control variable comprises at least one of a phase-shift angle of an output voltage, a frequency of the output voltage, the magnitude of the output voltage, the magnitude of an output current, and a DC link voltage.

Embodiment 41

The WPT method according to any of embodiments 24-40, wherein the transmitter-side input power control and the receiver-side output power control are implemented in analog form, digital form, or a combination thereof.

Embodiment 42

The WPT method according to any of embodiments 24-40, wherein the transmitter-side input power control and the receiver-side output power control are implemented in analog form.

Embodiment 43

The WPT method according to any of embodiments 23-40, wherein the transmitter-side input power control and the receiver-side output power control are implemented in digital form.

Embodiment 44

The WPT method according to any of embodiments 23-40, wherein the transmitter-side input power control and the receiver-side output power control are implemented in a combination of analog form and digital form.

Embodiment 45

The WPT method according to any of embodiments 24-44, wherein the transmitter winding is a transmitter coil.

Embodiment 46

The WPT method according to any of embodiments 24-45, wherein the receiver winding is a receiver coil.

A greater understanding of the present invention and of its many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

Figure 13:
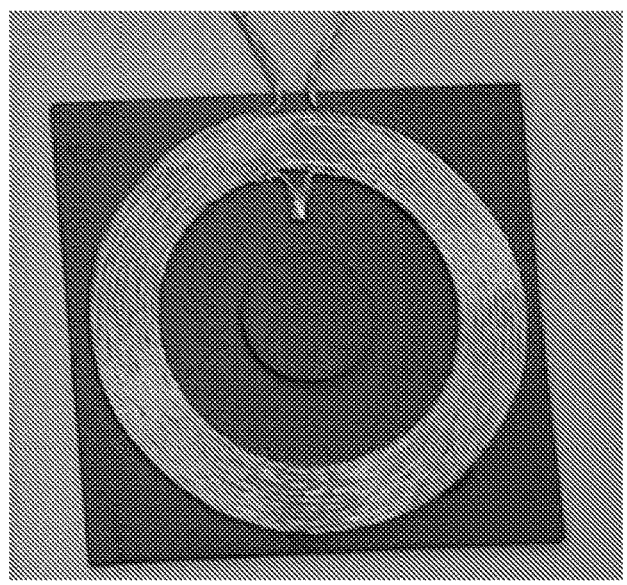
FIG. 13 shows an image of a coil in a WPT system according to an embodiment of the subject invention.
Figure 14:
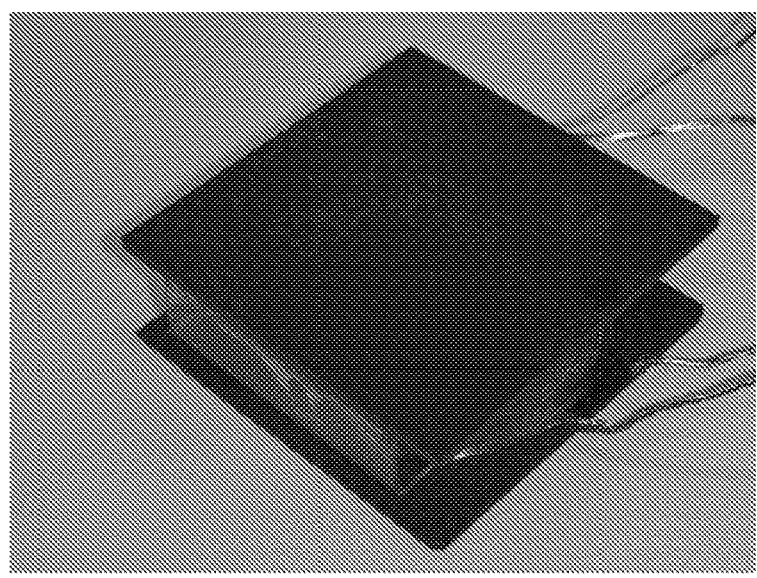
FIG. 14 shows an image of a WPT system according to an embodiment of the subject invention.

A WPT system was constructed using two identical coils of the type shown in the image in FIG. 13. FIG. 14 shows an image of the structure of the system. The system in FIG. 14 had a coupling coefficient of about 0.44. A DC-AC power converter with phase-shift control was used for verification. The parameters of the system are specified in Table 1. The operating frequency of the power inverter in the transmitter circuit was set at 97.56 kHz, which is approximately equal to the resonant frequencies of two resonators. The Litz wire had 24 strands of no. 40 AWG (0.08 mm diameter), and a ferrite plate with a thickness of 1 mm was used for shielding the WPT system. The nominal output DC voltage in the secondary circuit was set at 15 V.

TABLE 1

| Parameters of the WPT System | | |
|---|---|---|
| Parameters | Symbol | Practical Value |
| Inner diameter | $d_i$ | 21.7 mm |
| Coil width | $W_r$ | 5.32 mm |
| Outer diameter | $d_o$ | 27.02 mm |
| Number of turns per layer | — | 9 |
| Number of layers | — | 2 |
| Self-inductance of the transmitter | $L_1$ | 25.78 μH |
| Self-inductance of the receiver | $L_2$ | 25.1 μH |
| Mutual inductance | $M_{12}$ | 11.16 μH |
| Compensating capacitance of the transmitter | $C_1$ | 105.3 nF |
| Compensating capacitance of the receiver | $C_2$ | 106.2 nF |
| Resistance of each coil | $R_{P1}$ and $R_{P2}$ | 0.3 Ω |

A simulation was performed on the system. A DC-AC power converter with phase-shift control was used for the simulation so as to evaluate the relationship between the switching action of the decoupling switch, the magnitude of the primary winding current, and the charging/discharging times of the intermediate capacitor in the secondary circuit. The input DC voltage of the DC-AC power converter was initially set at 5 V, with the nominal DC voltage of the secondary circuit remaining at 15 V.

Figure 15:
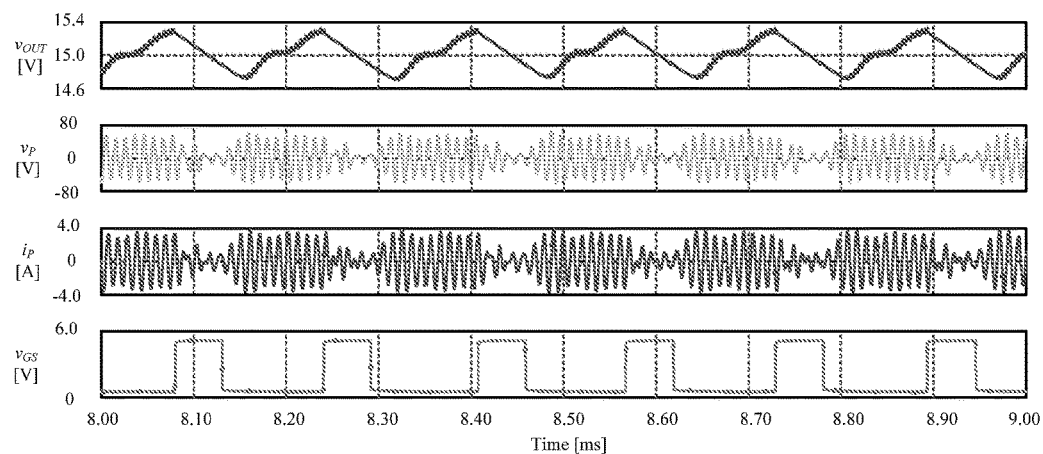
FIG. 15 shows simulation results of the current in a primary resonator and the output voltage when the root-mean-square value of the transmitter's output voltage is 5 V.

FIG. 15 shows the simulated current waveform of the primary resonator and the output voltage waveform when the DC source voltage was 5 V. $v_{GS}$ represents the gate-source voltage of the N-type MOSFET. When $v_{GS}$ is high, the decoupling MOSFET is turned on to decouple the load. The reflected impedance of the load on the primary side suddenly increases and so the magnitude of the current in the primary resonator becomes low. The output capacitor discharges from about 15.35 V to 14.65 V in this interval. The discharging time was approximately 90 μs. When the MOSFET is off, it is the charging interval and the time duration was about 140 μs. Referring to FIG. 15, the charging and discharging times of the intermediate capacitor can be estimated from the magnitude of the primary winding current or voltage. Therefore for each switching period, $t_{c1}$ and $t_{c2}$ can be easily monitored in the primary circuit.

Example 2

Figure 16:
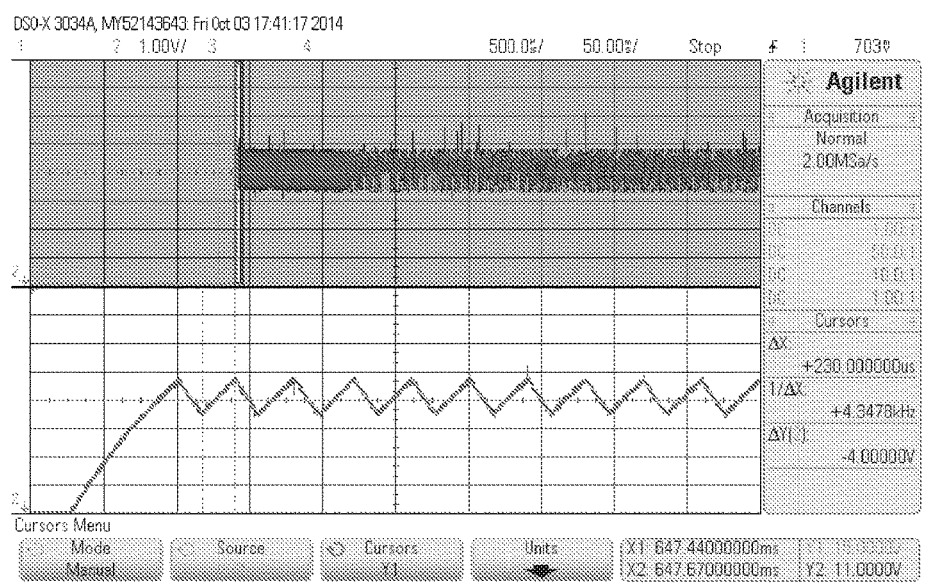
FIG. 16 shows secondary DC output voltage of a system at start-up stage.
Figure 17:
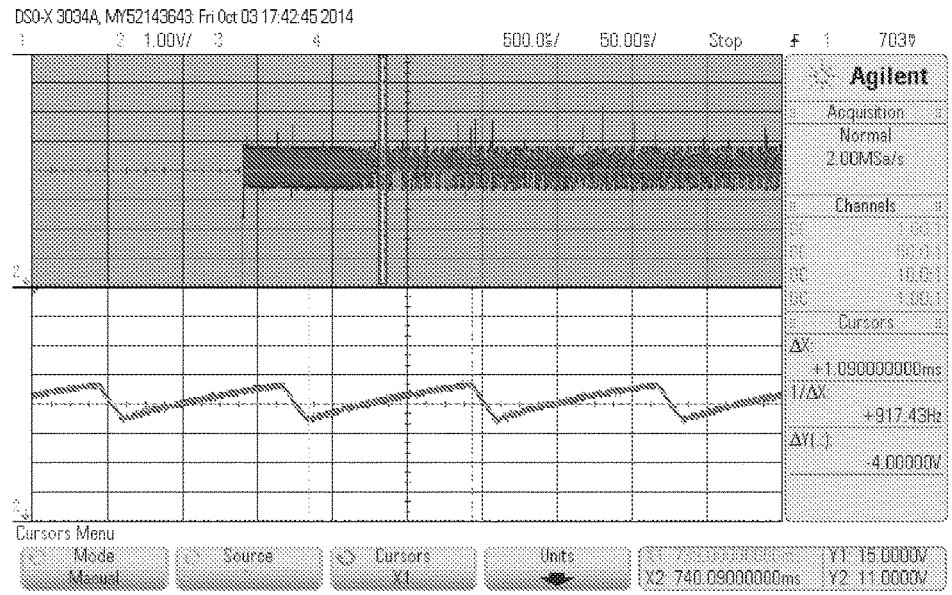
FIG. 17 shows output voltage of a system at steady-operation stage.
Figure 18:
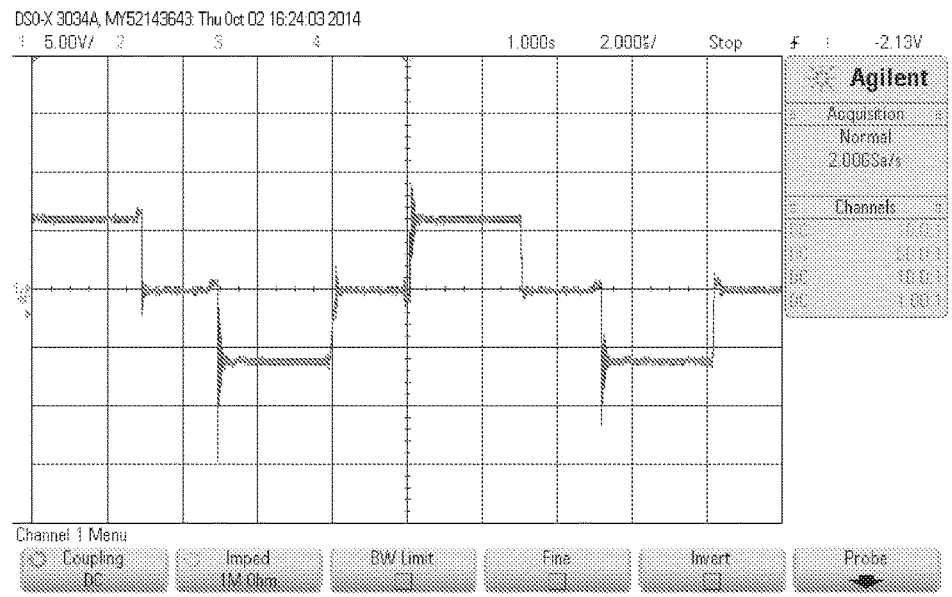
FIG. 18 shows final output voltage applied to a primary coil resonator.

Experiments were carried out based on the same system described in Example 1. The DC source voltage was set at 6 V, and the pulse width of the input voltage applied to the primary resonator (i.e., the output voltage of the inverter) was initially the largest (i.e., 0.5 times the switching period, which equals 5.125 μs). The operation of the system under full load condition (50 Ohm load) was evaluated. FIG. 16 shows the start-up waveform of the output voltage. The upper trace of FIG. 16 shows the output voltage of the secondary circuit with a time scale of 50 ms/div. The bottom trace in FIG. 16 is a highly enlarged view of a small window of the upper trace, with a time scale of 500 s/div. The charging time was about 230 μs after the output voltage reached the designed value of 15 V (with a ripple of approximately +/−0.5 V) as can be seen in the bottom curve. After about 90 ms, the charging time was prolonged to about 1.09 ms as shown in FIG. 17. The discharging time was about 170 μs for both cases. FIG. 18 shows that the final pulse width of the input voltage was about 2.96 μs. Similarly, another set of results were captured and shown in FIGS. 15-17 when the load resistance was shifted to 100Ω (i.e., 50% load). The initial charging time was then 150 μs, and the charging time at steady state was 1.1 ms. The pulse width of the input voltage was 2.08 μs as shown in FIG. 17.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] P. Si, A. P. Hu, J. W. Hsu, M. Chiang, Y. Wang, S. Malpas, and D. Budgett, "Wireless power supply for implantable biomedical device based on primary input voltage regulation," in *Proc. 2nd IEEE Conf. Ind. Electron. Appl.*, 2007, pp. 235-239.

[2] P. Si, A. P. Hu, S. Malpas, and D. Budgett, "A frequency control method for regulating wireless power to implantable devices," *IEEE Trans. Biomed. Circuits Syst.*, vol. 2, no. 1, pp. 22-29, March 2008.

[3] H. L. Li, A. P. Hu and G. A. Covic, "A power flow control method on primary side for a CPT system", International Power Electronics Conference, 2010, pp: 1050-1055.

[4] N. Y. Kim, K. Y. Kim, J. Choi, and C. W. Kim, "Adaptive frequency with power-level tracking system for efficient magnetic resonance wireless power transfer," *Electron. Lett.*, Vol. 48, No. 8, pp. 452-454, 12 Apr. 2012.

[5] J. Miller and O. Onar and M. Chinthavali, "Primary-side power flow control of wireless power transfer for electric vehicle charging", IEEE Journal of Emerging and Selected Topics in Power Electronics, Vol. 3, No. 1, March 2015, pp: 147-162.

[6] D. J. Thrimawithana and U. K. Madawala, "A primary side controller for inductive power transfer systems", IEEE International Conference on Industrial Technology (ICIT) 2010, 14-17 Mar. 2010, pp: 661-666

[7] M. Zaheer, J. S. Suri and H. B. Nemade, "Primary side control based inductively coupled powering scheme for biomedical implants", IEEE-EMBS International Conference on Biomedical and Health Infomatics (BHI 2012), Hong King and Shenzhen, China, 2-7 Jan. 2012, pp: 174-179

[8] S. Y. R. Hui, D. Lin, J. Yin, and C. K. Lee, "Method for parameter identification, load monitoring and output power control of wireless power transfer systems," U.S. Patent application, U.S. 61/862,627, Aug. 6, 2013.

[9] A. Trivino-Cabrera, M. Ochoa, D. Fernandez and J. A. Aguado, "Independent primary-side controller applied to wireless chargers for electric vehicles", IEEE International Electric Vehicle Conference (IEVC) 2014, Florence, Italy, 17-19 Dec. 2014, pp: 1-5

[10] Yin J., Lin D., Lee C. K. and Hui S. Y. R, "A Systematic Approach for Load monitoring and output power control of wireless power transfer systems without any direct output measurement", IEEE Transactions on Power Electronics, Vol. 30, Issue 3, 2015, pp: 1657-1667.

[11] T. S. Chan and C. L. Chen, "A primary side control method for wireless energy transmission system", IEEE Transactions on Circuits and Systems—I, Vol. 59, No. 8, August, 2012, pp: 1805-1814.

[12] John Boys and Grant Covic, "The Inductive Power Transfer Story at the University of Auckland", IEEE Circuits and Systems Magazine, April, 2015.

[13] Special Issue: Wireless Power Transmission, Technology & Applications, Proceedings of the IEEE, June 2013, Vol. 101, No. 6.

[14] U.S. Pat. No. 7,279,850.

What is claimed is:

1. A wireless power transfer (WPT) system, comprising:
a transmitter circuit comprising a transmitter winding; and
a receiver circuit comprising a receiver winding, an intermediate capacitor, and a decoupling switch,
wherein energy is transferred wirelessly through magnetic coupling of magnetic flux between the transmitter winding and the receiver winding, and
wherein the system implements transmitter-side input power control and receiver-side output power control without using any information about mutual inductance or mutual coupling factor between the transmitter circuit and the receiver circuit.

2. The WPT system according to claim 1, wherein the receiver-side output power control is implemented using a voltage of the intermediate capacitor as an indicator for power flow control, and
wherein the decoupling switch is used as a control mechanism to regulate the voltage of the intermediate capacitor at a nominal value within a tolerance.

3. The WPT system according to claim 1, wherein the receiver-side output power control is implemented using an output current to a load of the receiver circuit, and
wherein the decoupling switch is used as a control mechanism to regulate the output current to the load of the receiver circuit at a nominal value within a tolerance.

4. The WPT system according to claim 1, wherein the transmitter-side input power control detects charging times and discharging times of the intermediate capacitor of the receiver circuit by detecting at least one electric variable in the transmitter circuit.

5. The WPT system according to claim 4, wherein the at least one electric variable in the transmitter circuit comprises the magnitude of a current of the transmitter winding, the magnitude of a voltage of the transmitter winding, or both.

6. The WPT system according to claim 4, wherein the detected charging times and discharging times are used to derive a control signal for closed-loop control on the transmitter side to control the input power.

7. The WPT system according to claim 6, wherein the input power is controlled to dynamically meet the output power or load demand on the receiver side.

8. The WPT system according to claim 1, wherein the receiver-side output power control uses hysteresis control to regulate the voltage of the intermediate capacitor to a nominal value within a tolerance or a hysteresis band.

9. The WPT system according to claim 1, wherein the decoupling switch of the receiver circuit is configured to periodically decouple or isolate a load from receiving power directly from the receiver winding.

10. The WPT system according to claim 1, wherein a load connected to the receiver circuit receives power stored in the intermediate capacitor when the decoupling switch of the receiver circuit is activated, thereby discharging the intermediate capacitor when the load receives the power stored in the intermediate capacitor.

11. The WPT system according to claim 1, wherein the decoupling switch of the receiver circuit is a shunt decoupling switch or is a series decoupling switch.

12. The WPT system according to any of claims 1, wherein the transmitter-side input power control uses a control variable to control the input power to the transmitter circuit.

13. The WPT system according to claim 12, wherein the control variable comprises at least one of a phase-shift angle of an output voltage, a frequency of the output voltage, the magnitude of the output voltage, the magnitude of an output current, and a DC link voltage.

14. The WPT system according to any of claims 1, wherein the transmitter-side input power control and the receiver-side output power control are implemented in analog form, digital form, or a combination thereof.

15. The WPT system according to claim 1, wherein the transmitter winding is a transmitter coil and/or the receiver winding is a receiver coil.

16. The WPT system according to claim 1, wherein the system implements transmitter-side input power control and receiver-side output power control without any wireless communication circuit between the transmitter circuit and the receiver circuit providing feedback control.

17. The WPT system according to claim 16, wherein the receiver-side output power control is implemented using a voltage of the intermediate capacitor as an indicator for power flow control, and
wherein the decoupling switch is used as a control mechanism to regulate the voltage of the intermediate capacitor at a nominal value within a tolerance.

18. The WPT system according to claim 16, wherein the receiver-side output power control is implemented using an output current to a load of the receiver circuit, and
wherein the decoupling switch is used as a control mechanism to regulate the output current to the load of the receiver circuit at a nominal value within a tolerance.

19. The WPT system according to claim 16, wherein the transmitter-side input power control detects charging times and discharging times of the intermediate capacitor of the receiver circuit by detecting at least one electric variable in the transmitter circuit.

20. The WPT system according to claim 16, wherein the receiver-side output power control uses hysteresis control to regulate the voltage of the intermediate capacitor to a nominal value within a tolerance or a hysteresis band.

21. The WPT system according to claim 16, wherein the decoupling switch of the receiver circuit is configured to periodically decouple or isolate a load from receiving power directly from the receiver winding.

22. The WPT system according to claim 16, wherein a load connected to the receiver circuit receives power stored in the intermediate capacitor when the decoupling switch of the receiver circuit is activated, thereby discharging the intermediate capacitor when the load receives the power stored in the intermediate capacitor.

23. The WPT system according to claim 16, wherein the decoupling switch of the receiver circuit is a shunt decoupling switch or is a series decoupling switch.

24. The WPT system according to claim 16, wherein the transmitter-side input power control uses a control variable to control the input power to the transmitter circuit.

25. The WPT system according to claim 16 wherein the transmitter-side input power control and the receiver-side output power control are implemented in analog form, digital form, or a combination thereof.

26. The WPT system according to claim 16, wherein the transmitter winding is a transmitter coil and/or the receiver winding is a receiver coil.

27. A wireless power transfer (WPT) control method for a WPT system comprising: a transmitter circuit comprising a transmitter winding; and a receiver circuit comprising
a receiver winding, an intermediate capacitor, and a decoupling switch, wherein the method comprises:
transferring energy wirelessly through magnetic coupling of magnetic flux between the transmitter winding and the receiver winding; and
implementing transmitter-side input power control and receiver-side output power control without using any information about mutual inductance between the transmitter circuit and the receiver circuit and without any wireless communication circuit between the transmitter circuit and the receiver circuit providing feedback control.

28. The WPT method according to claim 27, wherein the receiver-side output power control is implemented using a voltage of the intermediate capacitor as an indicator for power flow control, and
wherein the decoupling switch is used as a control mechanism to regulate the voltage of the intermediate capacitor at a nominal value within a tolerance.

29. The WPT method according to claim 27, wherein the receiver-side output power control is implemented using an output current to a load of the receiver circuit, and
wherein the decoupling switch is used as a control mechanism to regulate the output current to the load of the receiver circuit at a nominal value within a tolerance.

30. The WPT method according to claim 27, wherein implementing transmitter-side input power control comprises detecting charging times and discharging times of the intermediate capacitor of the receiver circuit by detecting at least one electric variable in the transmitter circuit.

31. The WPT method according to claim 29, wherein the detected charging times and discharging times are used to derive a control signal for closed-loop control on the transmitter side to control the input power.

32. The WPT method according to claim 31, wherein the input power is controlled to dynamically meet the output power or load demand on the receiver side.

33. The WPT method according to claim 30, wherein the at least one electric variable in the transmitter circuit comprises the magnitude of a current of the transmitter winding, the magnitude of a voltage of the transmitter winding, or both.

34. The WPT method according to claim 27, wherein implementing receiver-side output power control comprises using hysteresis control to regulate the voltage of the intermediate capacitor to a nominal value within a tolerance or a hysteresis band.

35. The WPT method according to claim 27, wherein the decoupling switch of the receiver circuit periodically decouples or isolates a load from receiving power directly from the receiver winding.

36. The WPT method according to claim 27, wherein a load connected to the receiver circuit receives power stored in the intermediate capacitor when the decoupling switch of the receiver circuit is activated, thereby discharging the intermediate capacitor when the load receives the power stored in the intermediate capacitor.

37. The WPT method according to claim 27, wherein the decoupling switch of the receiver circuit is a shunt decoupling switch or is a series decoupling switch.

38. The WPT method according to claim 27, wherein implementing transmitter-side input power control comprises using a control variable to control the input power to the transmitter circuit.

39. The WPT method according to claim 38, wherein the control variable comprises at least one of a phase-shift angle of an output voltage, a frequency of the output voltage, the magnitude of the output voltage, the magnitude of an output current, and a DC link voltage.

40. The WPT method according to claim 27, wherein the transmitter-side input power control and the receiver-side output power control are implemented in analog form, digital form, or a combination thereof.

41. The WPT method according to claim 27, wherein the transmitter winding is a transmitter coil and/or the receiver winding is a receiver coil.

* * * * *

UNITED STATES PATENT AND TRADEMARK OFFICE
CERTIFICATE OF CORRECTION

PATENT NO. : 10,305,331 B2  
APPLICATION NO. : 15/570676  
DATED : May 28, 2019  
INVENTOR(S) : Wenxing Zhong and Shu Yuen Hui Page 1 of 1

It is certified that error appears in the above-identified patent and that said Letters Patent is hereby corrected as shown below:

In the Specification

Column 5,
Line 67, "and $C_2$ Referring" should read --and $C_2$. Referring--.

Signed and Sealed this
Twenty-fourth Day of March, 2020

Andrei Iancu
*Director of the United States Patent and Trademark Office*